(12) United States Patent
Nguyen et al.

(10) Patent No.: US 9,973,006 B1
(45) Date of Patent: May 15, 2018

(54) DETECTING MISCONFIGURED POWER SOURCES FOR A DEVICE

(71) Applicant: Amazon Technologies, Inc., Seattle, WA (US)

(72) Inventors: Huyen Van Nguyen, Bothell, WA (US); Richard Bradley Ernst, Ashburn, VA (US); Jared Joseph Lee, Marysville, WA (US); Michael P. Czamara, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 178 days.

(21) Appl. No.: 14/977,369

(22) Filed: Dec. 21, 2015

(51) Int. Cl.
*H02J 1/00* (2006.01)
*H02J 4/00* (2006.01)
*G06F 1/28* (2006.01)

(52) U.S. Cl.
CPC . *H02J 4/00* (2013.01); *G06F 1/28* (2013.01)

(58) Field of Classification Search
CPC .................................. H02J 4/00; G06F 1/28
USPC ............ 307/80, 64–66, 43, 29, 23; 713/340
See application file for complete search history.

(56) References Cited

U.S. PATENT DOCUMENTS

| 9,122,471 B2 | 9/2015 | Henise, IV et al. |
| 2012/0110386 A1* | 5/2012 | Hancock ................ G01R 31/40 714/41 |
| 2014/0164814 A1* | 6/2014 | Henise, IV ............... G06F 1/28 713/340 |

* cited by examiner

*Primary Examiner* — Thomas Skibinski
(74) *Attorney, Agent, or Firm* — Seed IP Law Group LLP

(57) ABSTRACT

Techniques are described for providing an automatic transfer switch (ATS), such as in a data center, to determine whether the power system coupled to a first power input on the ATS is the same power system or a different power system that is coupled to a second power input on the ATS. The ATS determines and compares the electrical characteristics (e.g., voltage, current harmonics, etc.) to determine if there is a difference between the determined characteristics. If the electrical characteristics are substantially similar, then a single power system is coupled to both power inputs on the ATS. But if the electrical characteristics are significantly different (e.g., the difference in the electrical characteristics is above a threshold), the power system coupled to one power input on the ATS is different from the power system coupled to the other power input on the ATS.

20 Claims, 5 Drawing Sheets

DETECTING MISCONFIGURED POWER SOURCES FOR A DEVICE

BACKGROUND

Organizations such as on-line retailers, Internet service providers, search providers, financial institutions, universities and other computing-intensive organizations often utilize large scale computing facilities or data centers to conduct computer operations. Such data centers house and accommodate a large amount of computing systems to process, store and exchange data as needed to carry out an organization's operations. Typically, these computing systems are maintained in racks, which provide power, networking and other supporting functionality to each separate computing system within a respective rack. Power is supplied to each rack from a primary power system, such as from a utility power feed entering the data center. Due to the reliance that organizations put on data centers to always be up and running, data centers generally also include a backup or reserve power system that can supply power to the racks and computing systems in case of a failure in the primary power system.

However, various problems sometimes exist with the implementation and use of such power systems.

DETAILED DESCRIPTION

Figure 1:
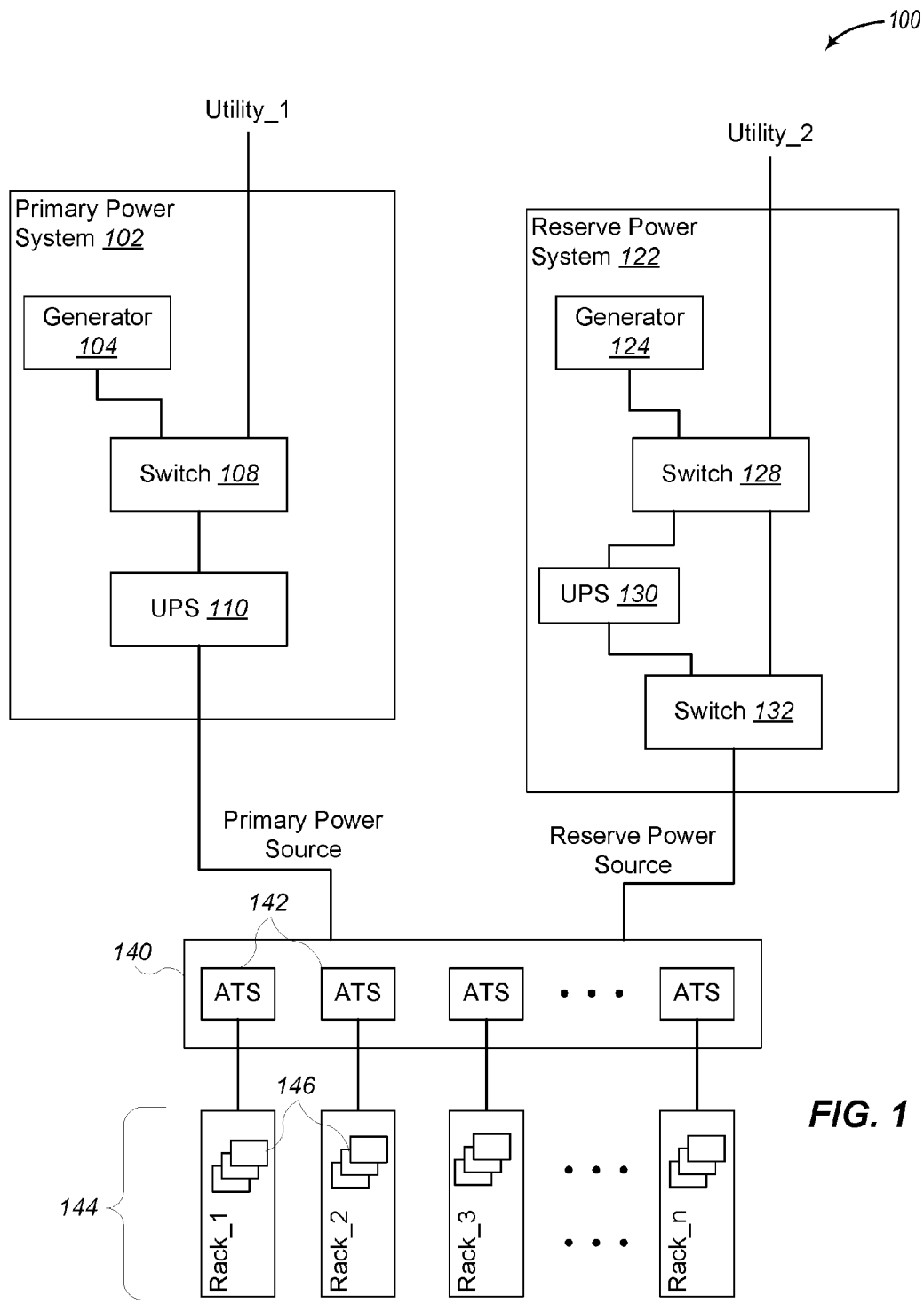
FIG. 1 is a block diagram illustrating an example data center environment having a reserve power system that backs up a primary power system.

Techniques are described for providing a power-switching device that is configurable to manage two or more power system inputs in specified manners, including to select one of the power system inputs from which to supply power to one or more additional devices attached to the power switching device. In at least some embodiments, the power switching device may be an automatic transfer switch (ATS) deployed in a data center and designed to have two or more power inputs that are each connected to a different power source, such as a primary power system that is typically used to power devices in the data center, and a secondary (e.g., reserve) power system for use if problems arise in the power supply from the primary power system. In such embodiments, the ATS or another connected device may be configured to analyze electrical characteristics of power being supplied via different power inputs on the ATS and to determine whether the power sources coupled to the different power inputs are the same (or inter-connected) power sources—if so, when a problem occurs with the primary power source, the power input for the secondary power source may not be available for use if it is incorrectly attached to (or inter-connected with) the primary power source. Accordingly, if the power sources connected to multiple power inputs are determined to be the same, the ATS or other connected device may further perform additional automated operations to initiate corrections to the problem. At least some of the described techniques may be implemented in at least some embodiments by automated operations of a Power Management System, such as may be executed on such an ATS or other device connected to the ATS, or instead may be implemented in other manners in other environments.

An example data center in which the described techniques may be used may include a plurality of computing systems housed by one or more racks, with a primary power system typically supplying sufficient power to the data center for each of the plurality of computing systems, and with the data center also having a reserve power system (e.g., a redundant power system to the primary power system, such as from one or more generators on the premises of the data center). In various embodiments, the reserve power system may be "oversubscribed," such that the total power requirements of computing systems coupled to the reserve power system exceed the capacity of the reserve power system to supply power at any given time. Accordingly, the reserve power system may not be fully redundant to the primary power system. In embodiments with such a primary and reserve power system, the primary and reserve power systems may be intended to be coupled to separate power inputs on each of one or more ATSes. Since data centers can include thousands of computing systems, the data center can also include hundreds, if not thousands, of ATSes to control power to each computing system. To get power to each ATS, wires are routed from the primary power system and from the reserve power system to each ATS—and are coupled to power inputs on each respective ATS. But due to the large numbers of wires running from the different power systems to ATSes it is possible for the wires from the different power systems to get mixed up. As a result, both power inputs on an ATS may be coupled to the primary power system, or both power inputs may be coupled to the reserve power system. If the primary power system is coupled to both inputs, and a power failure occurs with the primary power system, then the ATS cannot switch to a different, non-failing power system. On the other hand, if the reserve power system is coupled to both inputs, then the ATS may prematurely load the reserve power system, which can reduce the number of other systems that can use the reserve power system upon a failure in the primary system—and if there is a failure in the reserve power system, then the ATS again cannot switch to a different, non-failing power system.

As an illustrative example, an ATS determines whether a single power system or separate power systems are coupled to the ATS and provides an error notification (e.g., to a technician) when a single power system is coupled to the ATS. The ATS determines (e.g., by detecting or measuring) the electrical characteristics of the power system coupled to a first input on the ATS and the electrical characteristics of the power system coupled to a second input on the ATS. The ATS then compares the electrical characteristics of the two power systems. If the electrical characteristics are substantially similar, then a single power system is determined to be coupled to both power inputs on the ATS. But if the electrical characteristics are significantly different (e.g., the difference in the electrical characteristics is above a defined threshold), the power system coupled to one power input on the ATS is determined to be different from the power system coupled to the other power input on the ATS. In various embodiments, the comparison of the electrical characteristics is passive and performed without intentionally or actively modifying any characteristics of the power sources or power signals being compared. In other embodiments, the comparison of the electrical characteristics is active with one or more of the power sources or power signals being intentionally modified to create known differences in the signals, which can be detected in the signals being compared. In yet other embodiments, the comparison may include a combination of passive comparison of some electrical characteristics and active comparison of other electrical characteristics. The determined electrical characteristics may in some embodiments and situations be inherent features in the electrical signal supplied by the power system, and may include, but are not limited to, one or more of voltage, electrical current harmonics, frequency drift, waveform characteristics (e.g., amplitude, frequency, angular frequency, phase, etc.), or other measureable electrical characteristics of a power source or system. The determined electrical characteristics may in some embodiments and situations also include supplemental features in the electrical signal supplied by the power system, such as, but not limited to, the addition or injection of noise or a modulated frequency signal into the power signal of the power system. In some embodiments, the electrical characteristics of the primary power system (or the reserve power system, or both) may also be intentionally modified to create a difference in the electrical characteristics (e.g., to make a small alteration in the voltage supplied by the different power sources, such as 1-5 volts, a 1-2% difference in voltage, etc.). In other embodiments, the difference in electrical characteristics may be the result of the configuration or operating parameters of the two power systems.

In some embodiments, the ATS or other connected device may be configured to check multiple different electrical characteristics in power being supplied via two or more power inputs to determine if there is a measureable difference between the electrical characteristics of power systems coupled to the power inputs. In such situations, the determination of whether those power systems are different may be performed in various manners. For example, if the difference of any of the electrical characteristics is above a first threshold, then the different power systems are coupled to the ATS; if the difference of any of the electrical characteristics is below a second threshold, then a single power system is coupled to both inputs on the ATS; if the difference of multiple electrical characteristics is between the first and second threshold, then the combination may indicate a single or different power systems (e.g., a single power system if a weighted combination of the differences of a plurality of electrical characteristics is below a third threshold, or different power systems if the weighted combination is above the third threshold), etc.

As described herein, each ATS may perform the described functionality to determine if the coupled inputs are from a single system or different power systems. Embodiments, however, are not limited to ATSes, and in other embodiments, a different connected device (e.g., a handheld device) may perform that functionality to determine if the coupled inputs on one or more ATSes are from a single or different power system. For example, the handheld device may itself include two power inputs, and a technician may couple two power systems (e.g., the power systems that will be coupled to an ATS) to the power inputs, with the handheld device then determining and comparing the electrical characteristics of the power systems coupled to the two power inputs. Alternatively, the handheld device may be able to obtain information from an ATS or other source about power systems coupled to two or more power inputs of the ATS (e.g., by obtaining the same electrical signals being supplied to the power inputs, by obtaining information about electrical characteristics of those electrical signals that are determined by the ATS or other device, etc.), and then similarly perform further automated activities to compare the electrical characteristics of the power systems coupled to the two power inputs, optionally after determining the measurements of the electrical characteristics if not received from the ATS or other source. As before, if the electrical characteristics are sufficiently different (e.g., above one or more defined thresholds with respect to one or more types of electrical characteristics), then the power systems coupled to the different power inputs are determined to be different, and otherwise are determined to be the same. The handheld device can also output information (e.g., via one or more LED lights, information on a display of the handheld device, paper output, one or more electronic communications sent to a telephone or other device, etc.) to the technician indicating whether a single power system or separate power systems are coupled to the power inputs, to instruct the technician to correct any problems or otherwise initiate corrective actions.

In at least some example embodiments described below, the described techniques may be used with computing systems and devices in a data center, such as an online computing-related resource provider, although the described techniques may be used with other types of distributed or shared-computing-resource environments in other embodiments. In addition, while various specific types of computing systems and automatic transfer switches are discussed for the purpose of illustration, it will be appreciated that the described techniques may be used with other types of devices that control the supply of multiple power sources to a plurality of computing systems. Embodiments discussed below are provided for illustrative purposes and are simplified for the sake of brevity, and the inventive techniques may be used in a wide variety of other situations, some of which are discussed below.

FIG. 1 is a block diagram illustrating an example data center environment having a reserve power system that backs up a primary power system. Data center 100 includes a primary power system 102 and a reserve power system 122 to supply power to a plurality of computing systems 146 in racks 144. Data center 100 may also include other primary and reserve power systems (not shown) to supply power for other racks and computing systems that are not shown. The number of separate primary and reserve power systems that a data center has may be dependent on the number of computing systems it houses and the amount of power that a primary power system can supply.

Each of racks 144 house one or more computing systems 146. Each computing system 146 may provide computing resource and perform computing operations (e.g., virtual computer networks, databases, distributed storage systems, other virtual computing resources, or other distributed or on-demand computing resources) for one or more customers or users of the data center 100. Computing systems 146 receive power from and are supported by automatic transfer switches (ATS) 142. Each ATS 142 is coupled to and supplies power to one or more computing systems 146 in racks 144. In some embodiments, one ATS may provide power to one rack. In other embodiments, multiple ATSes may provide power to one rack with one or more computing systems in that rack receiving power from one ATS and one or more separate computing systems in that same rack receiving power from a separate ATS. In some embodiments, the computing systems that receive power from an ATS may be referred to supported computing systems of the ATS.

Each ATS 142 may control the selection or switching of input power to supply to computing systems 146 between a primary power source from the primary power system 102 and a reserve power source from the reserve power system 122. Each ATS 142 includes fault detection circuitry that can detect when a fault condition in the primary power source occurs (e.g., a power failure or a power event that could impact the operation of the computing devices 146 that receive power from that ATS). Upon detection of such a fault condition, the ATS can automatically switch power from the primary power system 102 to the reserve power system 122. Similarly, the fault detection circuitry can also detect when the primary power source returns and the ATS can automatically switch power from the reserve power system 122 back to the primary power system 102.

Each ATS 142 determines whether or not the power systems coupled to its power inputs are from different power systems or if they are the same power system. As used herein, different power systems are power systems that are separate from and supply power independent of one another, regardless of whether they have the same or different configurations or operating parameters.

In various embodiments, the ATS 142 determines an electrical characteristic value or function of the power systems coupled to each input. The ATS 142 compares the electrical characteristics—if there is a difference between the two values or functions, then the power sources are different. But if the two values or functions are similar (e.g., within a predetermined threshold), then the same power system is coupled to both power inputs on the ATS 142. In some other embodiments, the ATS 142 may compare a plurality of different electrical characteristics. If any one of the compared differences is above a first threshold, then the two power systems are different. But if any one of the compared differences is below a second threshold, or if a combination of multiple different comparisons are between the first and second thresholds, then a single power source is coupled to both inputs on the ATS. Examples, of the electrical characteristics may include, but are not limited to, voltage, current harmonics, waveform characteristics, frequency drift, or other measurable characteristics of the power systems that can change dependent on variations in the load and configuration of the power systems.

The ATSes 142 may be maintained in housing 140. The housing 140 provides the electrical backbone for connecting each ATS 142 to both the primary power system 102 and the reserve power system 122. The housing 140 includes one power input coupled to the primary power system 102 and one power input coupled to the reserve power system 122. In some embodiments, the ATSes may be located on each rack or within the reserve power system 122, rather than a separate housing. The housing 140 can also provide networking connections for each ATS 142 to connect with and communicate with priority information system 150 or other ATSes 142.

Primary power system 102 is a power system that is capable of supplying sufficient power to handle the total power requirements of each computing system coupled to the primary power system 102. The primary power system 102 receives its primary power through Utility_1. Utility_1 may be a utility feed to the data center or some other main source of power for the data center. The primary power system 102 includes switch 108 and generator 104. Switch 108 selects between power supplied by Utility_1 and generator 104 to be output as the primary power source. Generator 104 may include one or more electrical generators that provide backup power in the event of a power failure to or an insufficient power supply from Utility_1.

The primary power system 102 also includes an uninterruptible power supply (UPS) 110 that provides uninterrupted power in the event of a power failure upstream from the UPS 110, such as when power switches from Utility_1 to generator 104 during a failure in Utility_1. The UPS can also. As illustrated, the UPS 110 is "on line" or active and is continuously regulating the primary power source at a constant voltage. In other implementations, the UPS 110 may be in a bypass or other non-active mode.

The primary power system 102 may also include other components that are not illustrated. For example, the primary power system 102 may include power distribution units, transformers, or other electrical power components, which are not illustrated for ease of discussion.

Since many customers of the data center 100 rely on the computing systems in racks 144 being up and running, a constant source of power is important. Although generator 104 provides backup to Utility_1 for the primary power source, there may be situations where generator 104 fails or some other component of the primary power system 102 fails so that the primary power source is no longer available to supply power to the computing systems. Therefore, a reserve power system can provide power for such a situation.

Reserve power system 122 is a redundant power system to back up the primary power system 102. The reserve power system 122 may provide reserve power for all or a portion of the computer systems 146 in racks 144 supplied by primary power system 102. In some embodiments, reserve power system 122 is powered up at all times during operation of data center 100. Reserve power system 122 may be passive until a failure of one or more components of primary power system 102, at which time the reserve power system 122 may become active.

For reserve power system 122 to be completely redundant, it needs to be capable of supplying sufficient power to handle the total power requirements of each computing system coupled to the reserve power system 122—just as the primary power system 102 is capable of powering each computing system coupled to it. But because the likelihood of regularly resorting to the reserve power system 122 is very small, it can be a waste of money and resources for the reserve power system 122 to be completely redundant of the primary power system 102. Accordingly, the reserve power system 122 may be "oversubscribed" such that the total power requirements of computer systems 146 coupled to the reserve power system 122 exceed the capacity of the reserve power system 122 to supply power at any given time. Thus, the reserve power system 122 may not be fully redundant to the primary power system 102.

The reserve power system 122 receives its primary power through Utility_2. Utility_2 may be a utility feed to the data center or some other main source of power for the data center. In some embodiments, Utility_1 and Utility_2 may be separate utility feeds, or they may be a same utility feed into the data center 100. The reserve power system 122 includes switch 128 and generator 124. Switch 128 selects between power supplied by Utility_2 and generator 124 to be output as the reserve power source, which may also be referred to as a secondary or backup power source. Generator 124 may include one or more electrical generators that provide backup power in the event of a power failure to or an insufficient power supply from Utility_2. Generators 104 and 124 may be separate and distinct generators or they may be the same set of generators or a subset of a plurality of generators. The reserve power system 122 includes UPS 130 and switch 132. In the illustrated embodiment, UPS 130 is in a bypass mode and selected by switch 132 when there is a failure to the output of switch 128. Other configurations of the UPS may also be utilized. The reserve power system 122 may also include other components that are not illustrated. For example, the reserve power system 122 may include power distribution units, transformers, or other electrical power components, which are not illustrated for ease of discussion.

Figure 2:
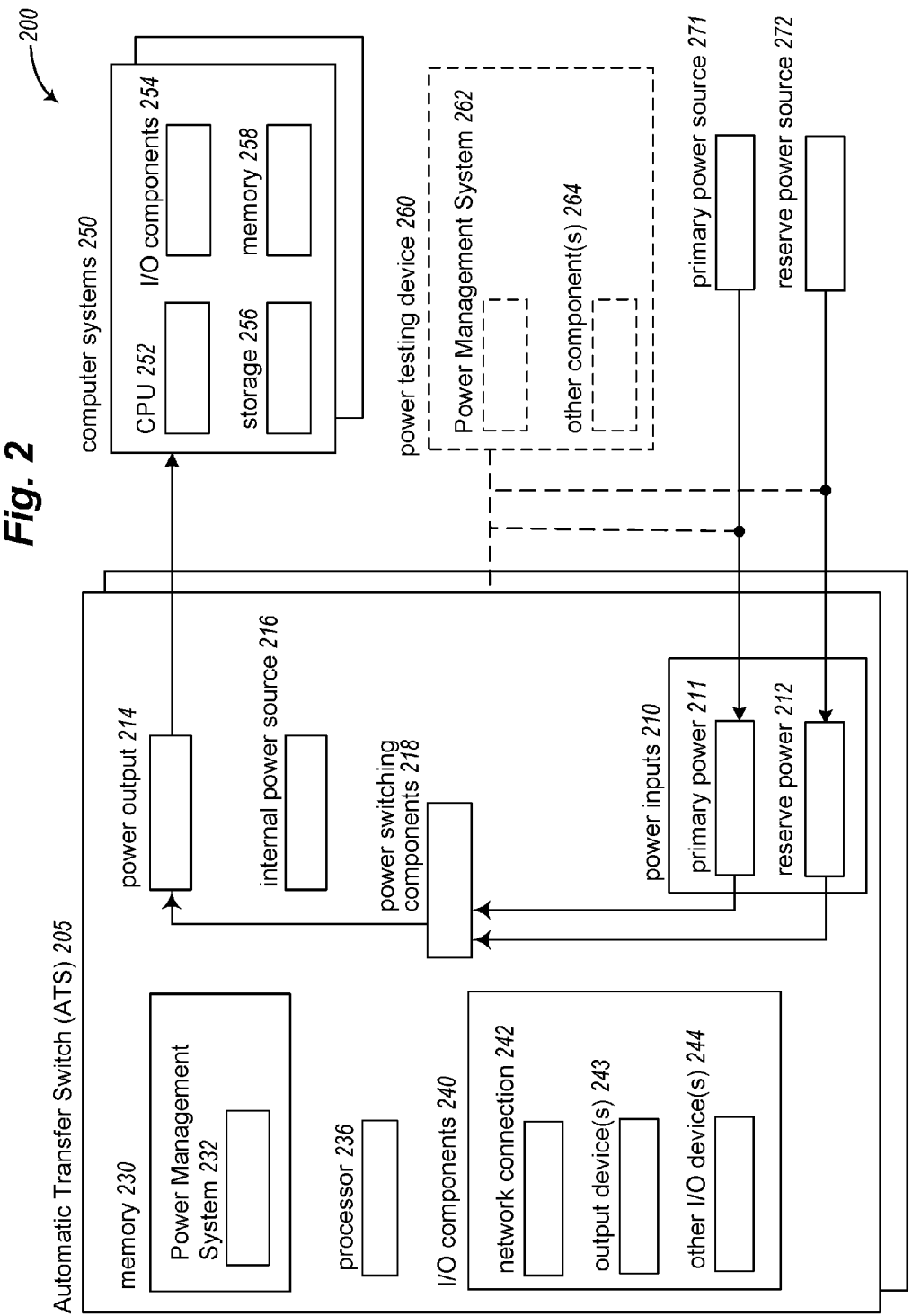
FIG. 2 is a block diagram illustrating an example automatic transfer switch with multiple power inputs, and one or more devices that may perform automated operations to determine whether the power inputs are connected to separate power sources.

FIG. 2 is a block diagram illustrating an example automatic transfer switch with multiple power inputs, and one or more devices that may perform automated operations to determine whether the power inputs are connected to separate power sources. In particular, FIG. 2 illustrates example system 200, which includes one or more automatic transfer switches (ATSes) 205, computer systems 250 that each receive power output from an ATS, primary and reserve power sources 271 and 272 that supply power to the ATSes, and optionally a separate power testing device 260 that may be configured to perform at least some of the described techniques.

Each ATS 205 is configured in this example embodiment to perform automated operations to provide at least some of the described techniques, including to operate a Power Management System 232 that provides functionality with which at least part of the described techniques can be employed, although in other embodiments one or more ATS testing devices may operate an analogous Power Management System 262, whether in addition to or instead of the Power Management System 232 of the ATS. In the illustrated embodiment, the ATS 205 has components that include power inputs 210, power output 214, internal power source 216, power switching components 218, one or more hardware computer processors 236, various data I/O ("input/output") components 240, storage 220 and memory 230.

The power inputs 210 receive power from multiple power sources and the ATS 205 can switch between them, such as if there is a power failure on one of the sources. The power inputs 210 include a primary power input 211 that is coupled to a primary power system 271 (e.g., primary power system 102 in FIG. 1) and a reserve power input 212 that is coupled to a reserve power system 272 (e.g., reserve power system 122 in FIG. 1), although other embodiments may include more than two power inputs, and/or may have multiple power inputs that are designed and configured to couple with power sources other than primary and reserve power sources (e.g., multiple alternative power sources without one that is designated as a primary source). The power output 214 is capable of supplying power from the power inputs 210 to one or more computer systems 250 coupled to the ATS 205. Internal power source 216 provides power to the ATS 205 to enable the ATS to switch between primary power input 211 and reserve power input 212 without having to rely on an external power source. Power switching components 218 include mechanical relays and power semiconductors that can switch from the primary power input 211 to the reserve power input 212 in the event of a power failure condition or event in a primary power source—and switch from the reserve power input 212 to the primary power input 211 when the primary power source is restored.

Power Management system 232 includes one or more modules stored in memory 230 (e.g., RAM, ROM, or other computer-readable storage medium) to determine electrical characteristics of the power system coupled to the primary power input 211 and the power system coupled to the reserve power input 212. The Power Management system 232 can compare these electrical characteristics to determine if a single power source is coupled to both the primary power input 211 and the reserve power input 212, or if different power sources are coupled to the power inputs 210. In various embodiments, Power Management system 232 includes various software instructions that, when executed, program one or more of the processors 236 to provide the described functionality. In various embodiments the described functionality may be employed through specialized circuitry directly coupled to the power inputs 210.

The illustrated I/O components 240 include a network connection 242, output device(s) 243, and optionally other I/O devices 244 (e.g., a keyboard or other input devices, speakers, etc.). The network connection 242 enables the ATS 205 to communicate with other ATSes, databases, a power testing device 260, or other computing devices not illustrated. The output device(s) 243 may include LEDs, display screens, audible alarms or other output mechanisms to indicate if the power source connected to the primary power input 211 and the power source connected to the reserve power input 212 are a same power source. In addition, the computer systems 350 may each have one or more CPUs 352, I/O components 354, storage 356 and memory 358, with the I/O components similar to I/O components 240, although some details are not illustrated for the computing systems 350 for the sake of brevity.

The power testing device 260, if present, may include a Power Management System 262 that includes some or all of the functionality of the Power Management System 232, as well as other components (e.g., one or more output devices similar to those of output devices 243; CPU, storage, and memory, such as if the Power Management System 262 is implemented partially or wholly with executable software instructions, in order to store and execute such instructions; electronic hardware circuitry, such as if the Power Management System 262 is implemented partially or wholly by such hardware circuitry; etc.).

The power testing device 260, if present, may in some embodiments be a handheld or mobile device used by a human technician (not shown) or other operator of the ATSes 205, and may optionally include one or more power inputs (not shown) that may be temporarily coupled to the cables or other power distribution mechanism used to supply power to an ATS being tested from what is intended to be multiple separate power sources. Alternatively, the power testing device 260 may in some embodiments, if present, connect directly to the ATS 205 being tested, such as to receive from the ATS the multiple power signals that are being supplied to its power inputs 210, and/or to receive information from the ATS about electrical characteristics of such power signals that are determined by the ATS (e.g., by the Power Management System 232; by other components of the ATS, not shown; etc.). After the power testing device 260 receives the power signals from the power source(s) and/or their electrical characteristics, the Power Management System 262 may determine the electrical characteristics (if not received) and analyze the electrical characteristics in order to determine whether multiple separate power sources are connected to the ATS, in a manner similar to the Power Management System 232 (if provided on the ATS being tested). If a problem is determined (e.g., multiple power inputs appear to be connected to a single power source, within a threshold level of difference in the one or more electrical characteristics being analyzed), the power testing device 260 may provide output to identify the problem, such as via output devices of the other components 264, via output devices 243 of the ATS being tested, etc. It will be appreciated that such a mobile power testing device 260 may be used to test multiple ATSes, such as sequentially, or optionally simultaneously if so designed and able to interact with the multiple ATSes simultaneously. In alternative embodiments, the power testing device 260 may be embedded in a dual-corded computer system that includes multiple power inputs that are both utilized to power the computer system. The Power Management System 262 may determine the electrical characteristics and analyze the electrical characteristics in order to determine whether multiple separate power sources are connected to the computer system, in a manner similar to the Power Management System 232. If a problem is determined, the power testing device 260 may provide output to identify the problem, such as via output devices of the other components 264.

It should be appreciated that ATS 205, power testing device 260, primary and reserve power sources 271 and 272, and computing systems 250 are merely illustrative and are not intended to limit the scope of the present disclosure. The computing systems may instead each include multiple interacting computing systems or devices, and the computing systems may be connected to other devices that are not illustrated, including through one or more networks such as the Internet, via the Web, or via private networks (e.g., mobile communication networks, etc.). In addition, an ATS may supply power to one or more computer-related resources that are not computer systems (e.g., storage devices, networking equipment, etc.), whether in addition to or instead of one or more computer systems.

It should also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the Power Management system 232 and/or by the Power Management system 262) or data structures, such as by execution of software instructions of the one or more software programs and/or by storage of such software instructions and/or data structures. Furthermore, in some embodiments, some or all of the systems or modules may be implemented or provided in other manners, such as by using means that are implemented at least partially or completely in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a non-transitory computer-readable storage medium, such as a hard disk or flash drive or other non-volatile storage device, volatile or non-volatile memory (e.g., RAM), a network storage device, or a portable media article to be read by an appropriate drive (e.g., a DVD disk, a CD disk, an optical disk, etc.) or via an appropriate connection. The systems, modules and data structures may also in some embodiments be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, at least some embodiments of the present disclosure may be practiced with other computer system configurations.

Figure 3:
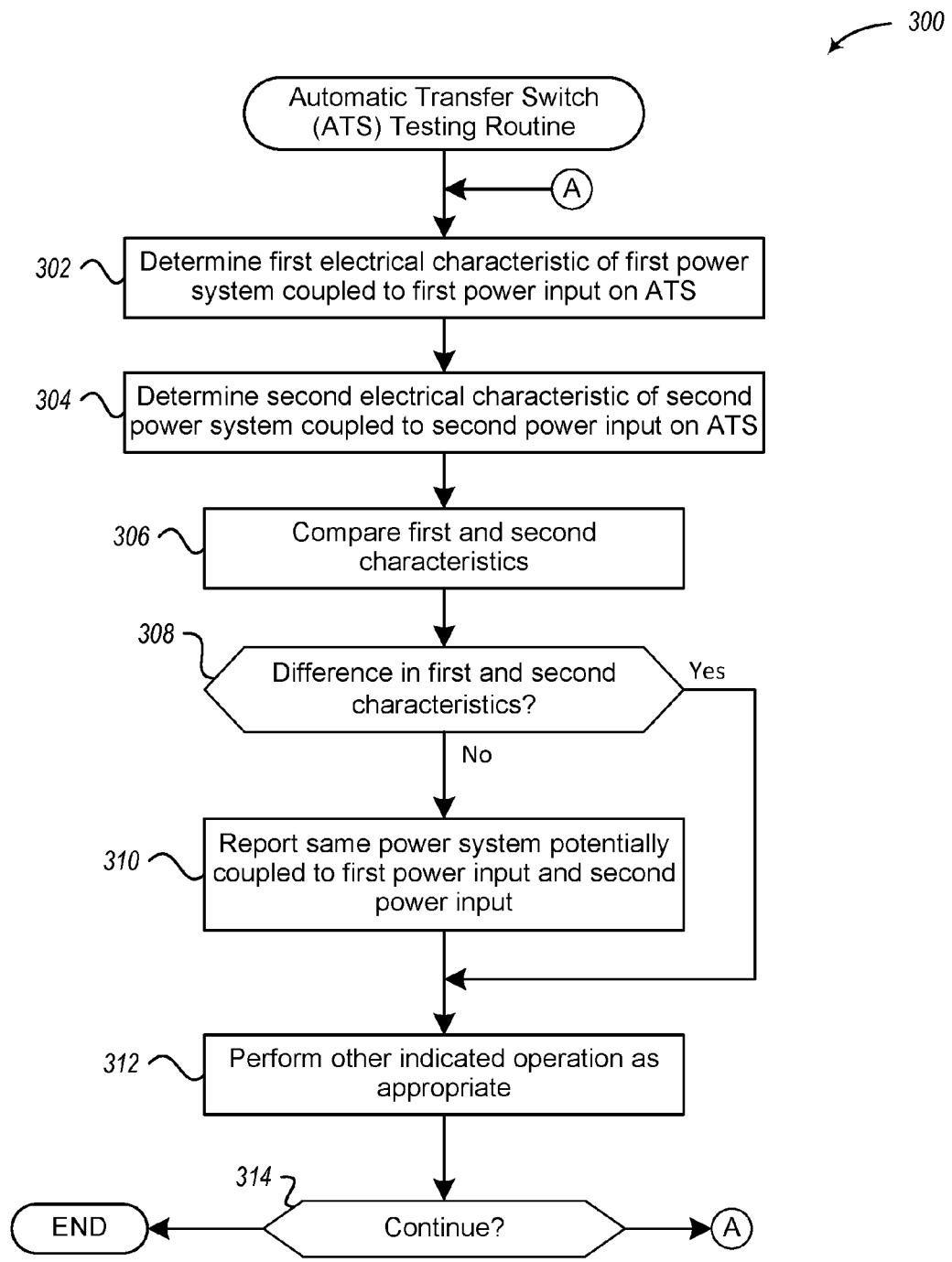
FIG. 3 illustrates a flow diagram of an example embodiment of an Automatic Transfer Switch Testing routine.
Figure 4:
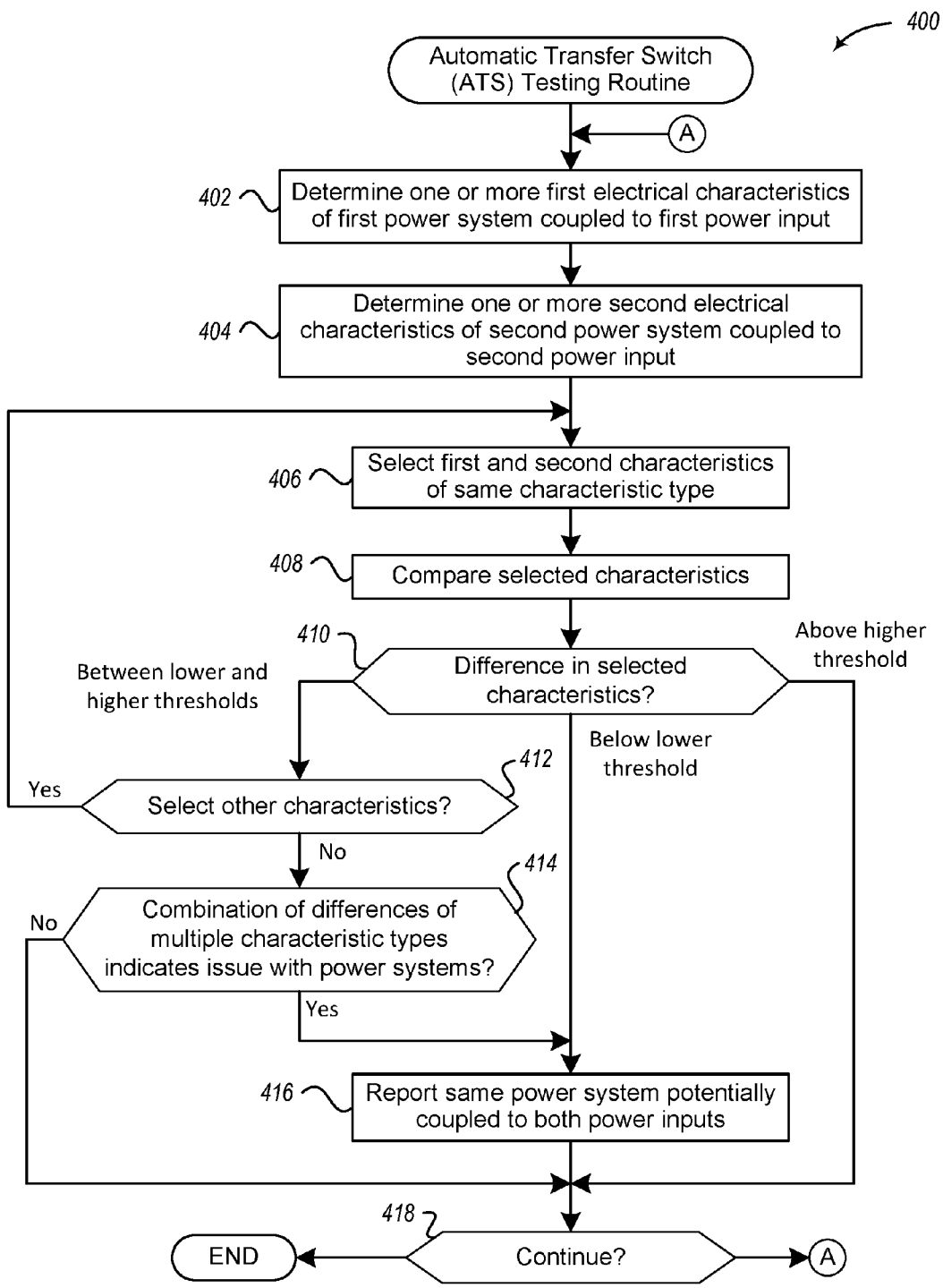
FIG. 4 illustrates a flow diagram of an alternative example embodiment of an Automatic Transfer Switch Testing routine.

FIGS. 3 and 4 illustrate flow diagrams of example embodiments of an Automatic Transfer Switch Testing routine. The routine 300 in FIG. 3 or the routine 400 in FIG. 4 may be provided by, for example, execution of the Power Management System 232 and/or Power Management System 262 of FIG. 2, by an automatic transfer switch or a handheld device, as discussed herein, such as to perform the described techniques for determining when a same source is connected to both a first (or primary) power input and a second (or reserve) power input. While the described techniques for determining same power sources are discussed in this example as being used in ATSes in a data center, it will be appreciated that such functionality may be provided by other systems and environments that supply primary and reserve power to a computing system or have multiple power inputs.

In the illustrated embodiment of FIG. 3, the routine 300 begins in block 302 to determine a first electrical characteristic of a first power system connected to a first power input on the ATS. In various embodiments, the first electrical characteristic may be one or more of a plurality of different types of electrical characteristics that are measurable in the power signal received at the first power input from the first power system. Depending on the type of electrical characteristic that is measured, the determined first electrical characteristic may be a single value, a set of values, a mathematical function (e.g., a results of performing a Fast Fourier Transform on the power signal), or other measurable amount.

In some embodiments, the electrical characteristics of a power system may be features inherent in the electrical signal supplied by the power system, such as, for example, voltage, current harmonics, waveform characteristics, frequency drift, and other electrical signal characteristics. These inherent features may be different from one power system to another based on the configuration of the power system and the load on the power system. For example, as described above, the ATS may have a primary power input and a reserve power input. The primary power input may be coupled to a primary power system capable of supplying power to meet the total power requirements of all computing systems coupled to the primary power system. On the other hand, the reserve power input may be coupled to a reserve power system that is capable of supplying power to meet the power requirements of only a subset, but not all, of the coupled computing systems. Due to the different configurations of the two power systems, the current harmonics, for example, of the primary power system may be different and distinguishable from the current harmonics of the reserve power system. Similarly, the waveform of the power signal received at the ATS from the primary power system may be different and distinguishable from the waveform of the power signal received at the ATS from the reserve power system. These differences may be attributable to the different configurations of the two power systems, the power cable distance between the power system and the ATS, unintentional, external interference on the power signals, or other environmental factors that can create deviation in a power signal being transported to the ATS—without having any characteristics actively modified by a human operator.

In other embodiments, the electrical characteristics may be features that are supplemental features in the electrical signal supplied by the power system. For example, noise or a modulated frequency signal can be added or injected into the power signal of the power system. In some embodiments, the modulated frequency signal can be modulated so as to indicate an identifier of the power system. In this way, each separate power system in a data center can be uniquely identified through a different modulated signal.

After block 302, the routine 300 continues to block 304 to determine a second electrical characteristic of a second power system connected to a second power input on the ATS. The second electrical characteristic is a same type as the first electrical characteristic determined in block 302. For example, if the first electrical characteristic is a voltage of the first power system, then the second electrical characteristic is a voltage of the second power system. Likewise, if the first electrical characteristic is the current harmonics of the first power system, then the second electrical characteristic is the current harmonics of the second power system.

In some embodiments, the first and second electrical characteristics may be determined at a particular point in time, such as by capturing the voltage of the first power system and the voltage of the second power system at substantially the same time. In other embodiments, first and second electrical characteristics may be determined over a defined period of time, such as capturing a plurality of values representative of the waveform of the power signal over the substantially same period of time.

After block 304, the routine 300 continues to block 306 to compare the determined first and second electrical characteristics. In some embodiments, this comparison is a subtraction of one value (e.g., the first electrical characteristic) from another value (e.g., the second electrical characteristic), such as by subtracting the voltage or current from one power source from the voltage or current from the other power source. In other embodiments, the comparison looks for similarities or differences between the first and second electrical characteristics, such as by comparing the current harmonics between the two power sources or comparing the waveforms of the power signals at the two inputs (e.g., if the two power sources connected to the inputs are separate power sources then the received waveforms should be discernably distinct from one another since separate power signals can fluctuate differently from one another due to random deviation caused by external interferences on the signals, such deviation may include jitter or other waveform distortions). As noted above, the determined characteristics are of a same characteristic type—thus, the comparison is performed on the measured or determined electrical characteristic values or functions of the power received from the first and second power systems.

In various embodiments, the comparison of the first and second electrical characteristics is performed without intentionally or actively modifying any of the power sources or power signals being compared. Rather external interference, environmental factors, or variations on the load of the power systems can result in differences being present in the electrical characteristics of the power signals, which allows for passive determination of whether differences exist in one or more electrical characteristics of the two or more power sources or signals being compared. In other embodiments, the comparison of the first and second electrical characteristics may be performed with at least one of the power sources being intentionally or actively modified by a human operator.

After block 306, the routine 300 continues to decision block 308 to determine whether the determined characteristics are different. In some embodiments, any difference between the first and second characteristics indicates that the characteristics are different. In other embodiments, a difference beyond a threshold indicates that the characteristics are difference; otherwise, they are deemed to be the same. The threshold may be a predetermined value that is selected to be indicative of different power systems. In some embodiments, this threshold may be selected by a human technician or administrator. In other embodiments, the threshold may be selected through automatic testing of various different thresholds to determine when a difference in the first a second characteristics indicates a high probability that they are from different power systems.

Not only can the difference determined at block 308 indicate whether the first power system and the second power system are different power systems, but the difference can also indicate which power system is coupled to which input on the ATS. For example, assume the voltage on the primary power system is increased by 5V and the comparison at block 306 is performed by subtracting the voltage at the second power input from the voltage at the first power input. If the resulting voltage difference is a positive number, then the primary power system is coupled to the first power input; otherwise, if the resulting voltage difference is a negative number, then the primary power system is coupled to the second power input.

In some embodiments, this information can be provided to a technician or administrator to initiate an action for the technician to change which power system is coupled to each power input on the ATS. For example, if the primary power system must be coupled to the first power input, but the ATS determines that it is coupled to the second power input, then the ATS may change an LED from green to yellow or display a message to the technician (e.g., by displaying on a display device associated with the ATS or by sending an SMS message to a mobile device of the technician) indicating that the wires connected to the power inputs on the ATS need to be swapped. In other embodiments, the ATS may utilize this information to determine which power input to use as a primary input and which to use as the reserve or backup input. For example, if the voltage of the primary power system is increased by 5V, the comparison is performed by subtracting the voltage at the second power input from the voltage at the first power input and the result is negative, then the ATS can determine that the primary power system is coupled to the second power input. As a result, the ATS can automatically use the second power input as its primary power input and the first power input as its backup power input. In this way, the ATS can supply power from the primary power system (via the second power input) to one or more computing systems regardless of the power input on the ATS to which the primary power system is coupled. And since there is a voltage difference, the ATS can determine that the coupled power systems are difference and can switch to using the reserve power system (via the first power input) to supply power to the computing systems in the event of a power failure in the primary power system.

If the first and second characteristics are determined to be different, then the first power system and the second power system are probably different power systems and the routine 300 continues to block 312; otherwise, the first power system and the second power system are likely to be the same power system and the routine 300 continues to block 310.

At block 310, the routine 300 reports that the first power system connected to the first power input and the second power system connected to the second power input are potentially the same power system. In some embodiments, the ATS may provide an error notification to indicate such a problem. The error notification may initiate corrective actions to couple a different power system to either the first power input or the second power input. In some embodiments, the error notification may include changing a state of one or more LEDs on the ATS, such as from green to red or initiate a flashing-red LED. In another embodiment, an error notification message may be displayed on a display device associated with to the ATS, such as outputting a code on one or more seven-segment LED displays or displaying other text on another display device. In yet another embodiment, an SMS message or other networking communication message may be sent to a mobile device of a human technician or administrator indicating that there is a problem with the power systems coupled to the ATS.

After block 310, or if the determined characteristics are different, the routine 300 continues to block 312. At block 312, the routine 300 performs one or more other indicated operations, if any, as appropriate. For example, in some embodiments, the routine 300 may monitor a primary power input for power failures in a primary power system, and, in response to detecting such a failure, switch to a reserve power system coupled to a reserve power input. Other types of operations performed with respect to block 312 may include various operations associated with the functioning of an ATS.

After block 312, the routine 300 continues to decision block 314 to determine whether to continue the routine and process additional information, such as recheck the power systems coupled to the ATS to determine if a change has been made resulting in a same power system being coupled to both the first and second power inputs. If it is determined to continue, the routine 300 returns to block 302; otherwise, the routine 300 ends or returns to a calling process to perform other actions.

FIG. 4 illustrates a flow diagram of an alternative example embodiment of an Automatic Transfer Switch Testing routine. In the illustrated embodiment of FIG. 4, the routine 400 begins in block 402 to determine one or more first electrical characteristics of a first power system coupled to a first power input on an ATS. In various embodiments, block 402 implements embodiments of block 302 in FIG. 3 but for one or more different types of electrical characteristics. For example, the routine 400 may determine both the voltage and the current harmonics of the first power system in one embodiment. Other combinations of types of electrical characteristics may also be employed.

After block 402, the routine 400 continues to block 404 to determine one or more second electrical characteristics of a second power system coupled to a second power input on the ATS. In various embodiments, block 404 implements embodiments of block 402 where the second electrical characteristics are the same type as the first electrical characteristics determined in block 402. For example, if the first electrical characteristics include both voltage and current harmonics of the first power system, then the second electrical characteristics include voltage and current harmonics of the second power system.

After block 404, the routine 400 continues to block 406 to select a first and second determined characteristic of a same characteristic type. For example, assuming voltage and current harmonics are determined for both power systems, the routine may select the determined current harmonics for the first power system and the determined current harmonics for the second power system. In some embodiments, the determined characteristics of a primary characteristic type may be selected first and the determined characteristics of other types may be later selected at decision block 412 depending on the differences between the determined primary characteristics at decision block 410.

After block 406, the routine 400 continues to block 408 to compare the selected characteristics to determine a difference between the first and second selected electrical characteristics. In various embodiments, block 408 implements embodiments of block 306 in FIG. 3 to compare the determined first and second electrical characteristics.

After block 408, the routine 400 continues to decision block 410 to determine the difference between the selected characteristics. In various embodiments one or more different threshold values may be utilized to determine how different the selected characteristics are from one another. These thresholds may be predetermined values or functions that are selected to be indicative of different power systems. In some embodiments, the thresholds may be selected by a human technician or administrator. In other embodiments, the thresholds may be selected through automatic testing of various different thresholds to determine when the difference in the first a second characteristics indicates a high probability that they are from different power systems, when the difference indicates a high probability that they are from a same power system, or when the difference is inconclusive of whether they are from the same or different power systems. In various embodiments, separate thresholds may be utilized for different characteristics types (e.g., the thresholds used with voltage differences may be separate from the thresholds used for current harmonics differences, which may be separate from the thresholds used for frequency shift differences, etc.

In the illustrated example, two thresholds are selected with one threshold being higher than the other threshold. If the difference between the selected characteristics is above the higher threshold, then the first power system coupled to the first power input is different from the second power system coupled to the second power input, and routine 400 continues to decision block 418. If the difference is below the lower threshold, then the power system coupled to the first power input is probably the same power system that is also coupled to the second power input, and routine 400 continues to block 416. If the difference is between the lower threshold and the higher threshold, then it may be indeterminable—by itself—whether the first power system coupled to the first power input is the same or different than the second power system coupled to the second power input, and routine 400 continues to decision block 412 to obtain additional information.

At decision block 412, the routine 400 determines whether another first and second electrical characteristic of the coupled input power systems is selected. In some embodiments, this determination may be based on the different types of characteristics determined at blocks 402 and 404 and which characteristics were previously selected at block 406. For example, if voltage and current harmonics are determined at blocks 402 and 404, and current harmonics was selected at block 406, then other electrical characteristics (e.g., voltage) can be selected. However, if current harmonics and voltage were previously selected on different iterations of block 406, then there may not be any additional electrical characteristics to select. If additional electrical characteristics are to be selected, the routine 400 loops to block 406 to select another first and second electrical characteristic that is of a same characteristic type but different from previously selected characteristics; otherwise, the routine 400 continues to decision block 414.

At decision block 414, the routine 400 determines whether the combination of differences from multiple different characteristic types is indicative of an issue (e.g., they are the same rather than being different) with the coupled power systems. In various embodiments, the difference of each of a plurality of different characteristic types may be between their respective lower and higher thresholds. So, individually they do not provide enough information to indicate (at decision block 410) that the first power system and the second power system are the same or different. In various embodiments, weights may be applied to the differences in the different characteristic types and then combined to determine a combined score that collectively is sufficient to determine if the first and second power systems are the same or different power systems. In some embodiments, the combined score is compared to an additional threshold, and if it exceeds the additional threshold, then the power systems are different and there is no issue—but if it does not exceed the additional threshold, then there may be an issue in that the first and second power systems may be the same. If it is determined that there is an issue with the input power systems, the routine 400 continues to block 416; otherwise, the routine 400 continues to decision block 418.

At block 416, the routine 400 reports that the first power system coupled to the first power input and the second power system coupled to the second power input are potentially the same power system. In various embodiments, block 416 implements embodiments of block 310 in FIG. 3 to report the problem and provide an error notification to a technician or administration and initiate corrective actions.

After block 416, or if the difference in one or more of the selected characteristics is above its respective higher threshold, or if the difference of one or more characteristics are between the higher and lower thresholds but their combination indicates that there is no issue with the coupled power systems, the routine 400 continues to decision block 418 to determine whether to continue the routine and process additional information, such as recheck the power systems coupled to the ATS to determine if a change has been made resulting in a same power system being coupled to both the first and second power inputs. If it is determined to continue, the routine 400 returns to block 402; otherwise, the routine 400 ends or returns to a calling process to perform other actions.

Although routine 300 in FIG. 3 and routine 400 in FIG. 4 are described as being performed by an ATS, embodiments are not so limited. In other embodiments, a handheld device may be utilized to perform similar functionality. For example, the handheld device may include two power inputs, determine and compare electrical characteristics of the power systems coupled to those inputs, determine if there is a difference between those characteristics to suggest whether the power systems are the same or different, and output a message indicating such determination—similar to what is described with respect to the functionality of the ATS.

Figure 5:
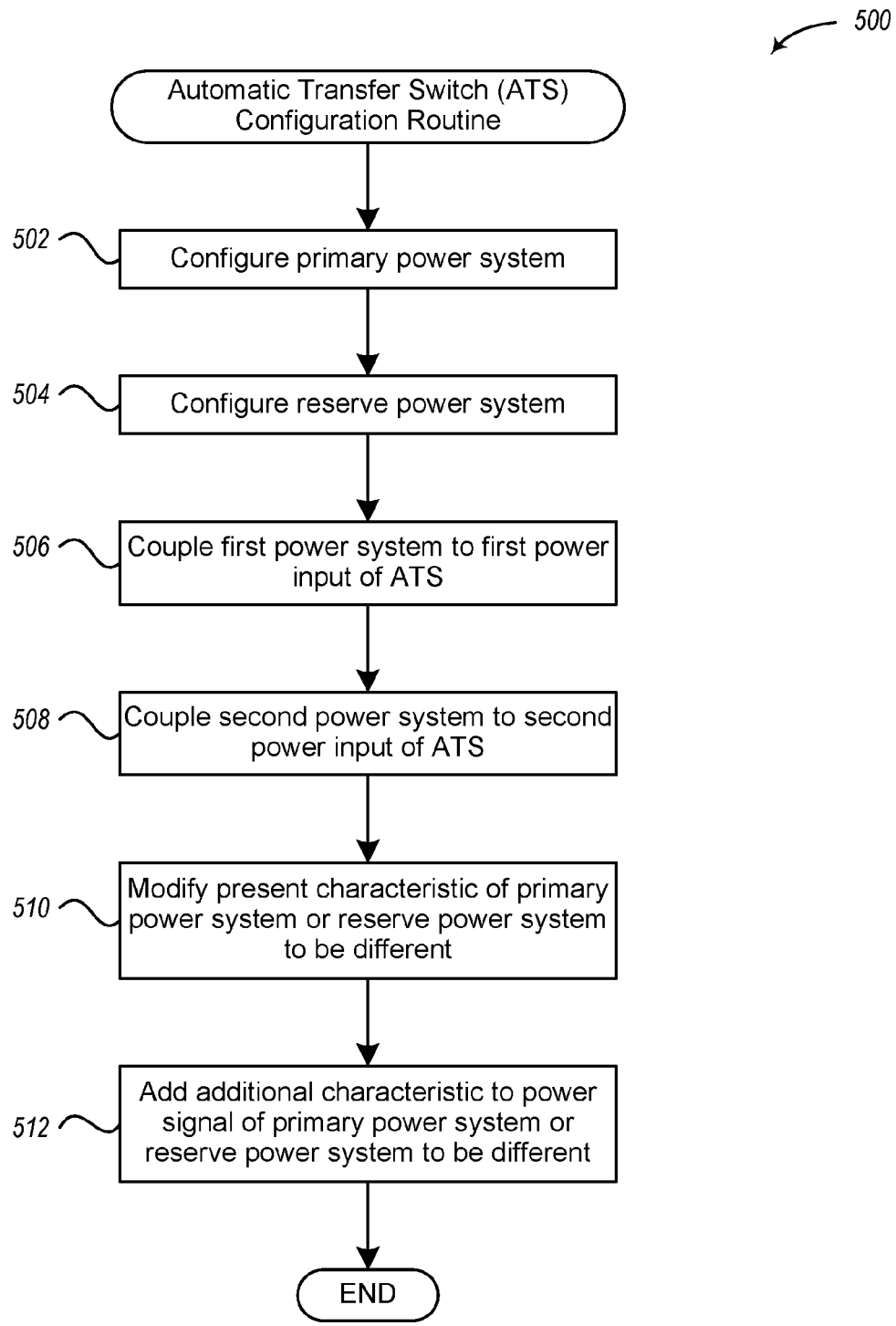
FIG. 5 illustrates a flow diagram of an example embodiment of an Automatic Transfer Switch Configuration routine.

FIG. 5 illustrates a flow diagram of an example embodiment of an Automatic Transfer Switch Configuration routine.

In the illustrated embodiment of FIG. 5, the routine 500 begins in block 502, where a primary power system (e.g., primary power system 102 in FIG. 1) is configured. Configuring the primary power system may include, among other things, coupling a utility feed and backup generators to the system, setting up circuit breakers, running wires, configuring a UPS, etc.

After block 502, the routine 500 continues to block 504, where a reserve power system (e.g., reserve power system 122 in FIG. 1) is configured. Configuring the reserve power system may include, among other things, coupling a utility feed and backup generators to the system, setting up circuit breakers, running wires, configuring a UPS, etc.

After block 504, the routine 500 continues to block 506, where a first power system is coupled a first power input on an ATS. The first power system may be the primary power system or the reserve power system.

After block 506, the routine 500 continues to block 508, where a second power system is coupled to a second power input on the ATS. The second power system may be the primary power system or the reserve power system.

Preferably, the primary power system is coupled to the first power input (at block 506) and the reserve power system is coupled to the second power input (at block 508). This configuration allows for the ATS to have to two sources of power, a primary power source from the primary power system and a backup or reserve power source from the reserve power system. In the event of a power failure in the primary power source, the ATS can switch from the primary power source to the reserve power source to supply power to one or more computing systems coupled to the ATS. So, for the reserve power system to be a backup system, the primary power system should be coupled to the first power input on the ATS and the reserve power system should be coupled to the second power input on the ATS.

But data centers often have large numbers of wires running from the different power systems to a plurality of ATSes that supply power to a plurality of racks and computing systems. As technicians couple power systems to the power inputs on an ATS, it is possible for the wires from the different power systems to get mixed up. As a result, both power inputs on the ATS may be coupled to the primary power system, or both power inputs may be coupled to the reserve power system. If the primary power system is coupled to both inputs, and a power failure occurs with the primary power system, then the ATS cannot switch to a different, non-failing power system. On the other hand, if the reserve power system is coupled to both inputs, then the ATS will prematurely load the reserve power system, and if there is a failure in the reserve power system, then the ATS again cannot switch to a different, non-failing power system. It can be difficult, however, to determine whether different power system are coupled to the ATS or if a single or same power system is coupled to the ATS.

After block 508, the routine 500 continues to block 510 to modify a present characteristic of the primary or reserve power system to be different from the other power system. Since the reserve power system is to be a backup system to the primary power system, the some output electrical characteristics (e.g., voltage) of the reserve power system should be substantially the same as the output electrical characteristics of the primary power system. By modifying a present characteristic, such as voltage, of one of the power systems to be different from the other system, the ATS can determine if the power systems coupled to its power inputs are the same power system or different power systems.

In some embodiments, the voltage of the primary power system may be increased or decreased one or two percent (or some other voltage difference that is significant enough to be detected by the ATS and can be supported by the primary power system and those computing systems coupled to the primary power system) from its normal regulated voltage, which creates a difference between its voltage and the voltage of the reserve power system. In other embodiments, the voltage of the reserve power system may be increased or decreased one or two percent (or some other voltage difference that is significant enough to be detected by the ATS and can be supported by the reserve power system and those computing systems coupled to the reserve power system) from its normal regulated voltage, which creates a different between its voltage and the voltage of the primary power system. In yet other embodiments, the voltage of the primary power system may be increased from its normal regulated voltage and the voltage of the reserve power system may be decreased (or vice versa), which creates a voltage difference between the primary and reserve power systems.

By creating a voltage difference between the primary and reserve power systems, the ATS can determine if the same or different power systems are coupled to the ATS, such as described elsewhere herein. Briefly, for example, if the primary power system is coupled to one power input and the reserve power system is coupled to the other power input, then the ATS should detect a voltage difference between the power systems coupled to the two inputs. But if the primary power system (or the reserve power system) is coupled to both the first and second power inputs, then the ATS should detect no, or very little, difference in the voltage between the power systems coupled to the two inputs.

Although modifying the voltage of one or both of the primary and reserve power systems is described here, embodiments are not so limited and other present electrical characteristics may be also modified, such as, for example, modifying the frequency or adjusting the phase angle of the power signal.

After block 510, the routine 500 continues to block 512 to add additional characteristics to the power signal of the primary power system or the reserve power system, or both. In one embodiment, an RF signal, such as random noise, may be added or superimposed on the power signal from the primary power source but not to the reserve power source. Similarly, the RF signal may be added or superimposed on the power signal from the reserve power source but not the primary power source. The addition of the noise to one signal, but not the other creates a difference between the two power signals, which as described elsewhere herein can be used to determine if a same or different power sources are coupled to the ATS.

In various other embodiments, a modulated frequency signal may be injected into one or both of the power signals from the primary and reserve power systems. This modulated signal may be indicative of or include a unique identifier of its corresponding power system. The identifier may be added to the power signal from the primary power system but not from the reserve power system. Or it may be added to the power signal from the reserve power system but not from primary power system. Or different identifiers can be added to both power signals. Similar to modifying the voltage of one or both power systems, as described above, adding additional electrical characteristics to the power signals can create differences in the power signals from the different power systems, which can be used to determine if the same or different power systems are coupled to the ATS.

In various embodiments, block 510 or block 512 may be optional and may not be performed. After block 512, the routine 500 ends.

It should also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art should appreciate that in other embodiments the operations may be performed in other orders and in other manners. Those skilled in the art should also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it should be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. An automatic transfer switch comprising:
   a primary power input coupled to a first power system, wherein the primary power input is designed to be coupled to a primary power system;
   a secondary power input coupled to a second power system, wherein the secondary power input is designed to be coupled to a reserve power system, and wherein one of the primary and reserve power systems is modified to change a specified electrical characteristic of that one power system;
   a power output coupled to a computing system, wherein the power output supplies power to the computing system from a selectable source that is one of the first power system or the second power system; and
   a processor that, in response to executing software instructions, causes the automatic transfer switch to:
     determine a first electrical characteristic of power supplied from the first power system via the primary power input, and determine a second electrical characteristic of power supplied from the second power system via the secondary power input;
     determine, based on a comparison of the first and second electrical characteristics, that the first power system and the second power system are a single power system by detecting the specified electrical characteristic from both the primary and secondary power inputs or by not detecting the specified electrical characteristic from either of the primary and secondary power inputs; and provide, in response to determining that the first power system and the second power system are the single power system, an error notification.

2. The automatic transfer switch of claim 1 wherein the primary power system is capable of powering a plurality of computing systems, wherein the reserve power system is separate from the primary power system and is capable of powering only a subset of the plurality of computing systems, and wherein the determining that the first power system and the second power system are the single power system includes determining that at least one of the primary and secondary power inputs is coupled to an incorrect power system.

3. The automatic transfer switch of claim 1 wherein the determining that the first power system and the second power system are the single power system includes:
   determining, based on the comparison of the first and second electrical characteristics, a difference between the first electrical characteristic and the second electrical characteristic; and
   identifying, in response to the difference being below a threshold, that the first power system and the second power system are not different power systems.

4. The automatic transfer switch of claim 1 wherein the providing of the error notification includes changing a display state of an error LED (light emitting diode), displaying an error message on a display device, or sending an electronic message to a mobile device of a human operator of the automatic transfer switch.

5. A method comprising:
   supplying, by an automatic transfer switch, power to an attached computing system from a first power source that is coupled to a first power input of the automatic transfer switch, wherein the automatic transfer switch also has a second power input designed to be coupled to a second power source separate from the first power source;
   modifying a specified electrical characteristic of one of the first and second power sources;
   determining a first electrical characteristic of power supplied to the automatic transfer switch via the first power input and a second electrical characteristic of power supplied to the automatic transfer switch via the second power input;
   determining, based on a comparison of the first and second electrical characteristics, that the first and second power sources are not separate power sources by detecting the modified specified electrical characteristic from both the first and second power inputs or by not detecting the modified specified electrical characteristic from either of the first and second power inputs; and
   providing, in response to determining that the first and second power sources are not separate power sources, an error notification.

6. The method of claim 5 wherein the providing of the error notification includes providing information to a human operator indicating that the first and second power sources are not separate power sources.

7. The method of claim 5 wherein the determining of the first electrical characteristic includes determining a first voltage supplied to the first power input, wherein the determining of the second electrical characteristic includes determining a second voltage supplied to the second power input, and wherein the determining that the first and second power sources are not separate power sources includes determining that the first and second voltages differ by at most a threshold difference.

8. The method of claim 5 wherein the determining of the first electrical characteristic includes determining a first harmonics of a first current supplied to the first power input, wherein the determining of the second electrical characteristic includes determining a second harmonics of a second current supplied to the second power input, and wherein the determining that the first and second power sources are not separate power sources includes determining that the first and second harmonics differ by at most a threshold difference.

9. The method of claim 5 wherein the determining of the first electrical characteristic includes determining a first frequency drift of a first electrical signal supplied to the first power input, wherein the determining of the second electrical characteristic includes determining a second frequency drift of a second electrical signal supplied to the second power input, and wherein the determining that the first and second power sources are not separate power sources includes determining that the first and second frequency drifts differ by at most a threshold difference.

10. The method of claim 5 wherein the first and second electrical characteristics include voltage characteristics, current characteristics, waveform characteristics, or frequency drift, and wherein the determining that the first and second power sources are not separate power sources includes comparing the first and second electrical characteristics and determining that the first and second power sources are a single power system.

11. The method of claim 5 wherein the modifying of the specified electrical characteristic includes modifying a voltage of only one of the first and second power sources by a specified amount, and wherein the determining that the first and second power sources are not separate power sources includes detecting the modified voltage from both the first and second power inputs or not detecting the modified voltage from either of the first and second power inputs.

12. The method of claim 5 wherein the modifying of the specified electrical characteristic includes adding an additional signal to a power signal supplied by one of the first and second power sources, and wherein the determining that the first and second power sources are not separate power sources includes detecting the additional signal from both the first and second power inputs or not detecting the additional signal from either of the first and second power inputs.

13. The method of claim 12 wherein the adding of the additional signal includes injecting an additional noise signal to the power signal supplied by the one of the first and second power sources.

14. The method of claim 12 wherein the adding of the additional signal includes injecting an additional modulated frequency signal as an identifier to the power signal supplied by the one of the first and second power sources.

15. The method of claim 5, wherein the first and second electrical characteristics are of a first type, and wherein the determining that the first and second power sources are not separate power sources includes:
   determining a difference between the first and second electrical characteristics;
   in response to the difference between the first and second electrical characteristics being above a first threshold, determining that the first and second power sources are separate power sources;
   in response to the difference between the first and second electrical characteristics being below a second threshold, determining that the first and second power sources are not separate power sources; and in response to the difference between the first and second electrical characteristics being below the first threshold and above the second threshold, performing further actions, including:
  determining a third electrical characteristic of power supplied to the automatic transfer switch via the first power input and a fourth electrical characteristic of power supplied to the automatic transfer switch via the second power input, wherein the third and the fourth electrical characteristics are of a second type;
  determining a difference between the third and fourth electrical characteristics;
  in response to the difference between the third and fourth electrical characteristics being above a third threshold, determining that the first and second power sources are separate power sources;
  in response to the difference between the third and fourth electrical characteristics being below a fourth threshold, determining that the first and second power sources are not separate power sources; and
  in response to the difference between the third and fourth electrical characteristics being below the third threshold and above the fourth threshold, determining that the first and second power sources are not separate power sources based on a combination of the difference between the first and second electrical characteristics and the difference between the third and fourth electrical characteristics.

16. A device comprising:
an output device; and
a plurality of electronic circuits that, in combined operation:
  determine a first electrical characteristic of power supplied to a first power input of a system and determine a second electrical characteristic of power supplied to a second power input of the system;
  determine, based on a comparison of the first and second electrical characteristics, that the first and second power inputs are coupled to a single power source by analyzing the first and second electrical characteristics to detect a modified voltage of a power source coupled to at least one of the first and second power inputs; and
  provide, in response to determining that the first and second power inputs are coupled to the single power source, an error notification via the output device.

17. The device of claim 16 wherein the device is a mobile device for a human operator.

18. The device of claim 16 wherein the device is a dual-corded computer system that utilizes power from multiple power sources, wherein the plurality of electronic circuits include a processor and a memory, and wherein the memory stores instructions that when executed by the processor cause the device to provide information via the output device to a human operator indicating that the first and second power inputs are coupled to the single power source.

19. The device of claim 16 wherein the first and second electrical characteristics each include measurements of multiple electrical properties, and wherein the determining that the first and second power inputs are coupled to a single power source includes comparing differences in the measurements of the multiple electrical properties for the first and second electrical characteristics and determining that all of the differences are less than a defined threshold.

20. The device of claim 19 wherein the multiple electrical properties include voltage, current harmonics, waveform characteristics, or frequency drift.

* * * * *